United States Patent [19]

Jacobs et al.

[11] Patent Number: 4,896,259
[45] Date of Patent: Jan. 23, 1990

[54] APPARATUS FOR STORING MODIFYING DATA PRIOR TO SELECTIVELY STORING DATA TO BE MODIFIED INTO A REGISTER

[75] Inventors: Michael N. Jacobs; David O. Lewis, both of Rochester; Dale J. Thomforde, Pine Island, all of Minn.

[73] Assignee: International Business Machines Corporation, Armonk, N.Y.

[21] Appl. No.: 125,725

[22] Filed: Nov. 30, 1987

Related U.S. Application Data

[63] Continuation of Ser. No. 648,851, Sep. 7, 1984, abandoned.

[51] Int. Cl.$^4$ .......................... G06F 3/05; G06F 9/00; G06F 9/32
[52] U.S. Cl. ..................... 364/200; 364/261; 364/261.1; 364/245.2; 364/255.4; 364/252.6; 364/222.1
[58] Field of Search ................. 364/200, 900

[56] References Cited

U.S. PATENT DOCUMENTS

| | | | |
|---|---|---|---|
| 4,040,030 | 8/1977 | Cassonnet | 364/200 |
| 4,048,623 | 9/1977 | Gruner | 364/900 |
| 4,157,586 | 6/1979 | Gannon et al. | 364/200 |
| 4,298,929 | 11/1981 | Capozzi | 364/200 |
| 4,394,736 | 7/1983 | Bernstein | 364/200 |
| 4,408,272 | 10/1983 | Walters | 364/200 |
| 4,514,804 | 4/1985 | Kimoto | 364/200 |
| 4,559,596 | 12/1985 | Ohnishi | 364/200 |
| 4,569,016 | 2/1986 | Hao | 364/200 |
| 4,631,668 | 12/1986 | Kubo | 364/200 |
| 4,680,702 | 7/1987 | McCarthy | 364/200 |

OTHER PUBLICATIONS

System/370 Model 168 TO/DM (vol. 1).

Primary Examiner—Raulfe B. Zache
Assistant Examiner—Emily Y. Chan
Attorney, Agent, or Firm—Bradley A. Forrest

[57] ABSTRACT

A data reading and modifying device of a computer system has a main storage for storing first data, portions of which are to be modified by various modifying data. The access speed of the main storage is slower than the speed at which the modifying data is accessed. A controller initiates fetches of first data from the main store and selects the modifying data. A register is coupled to the main storage for receiving and storing first data as it is provided from the main storage. Portions of the register are reserved for modifying data which is preferably inserted into the register before receipt of the first data as controlled by the controller. The first data received from the main storage is inserted into remaining portions of the register and insertion of, first data into portions reserved for modifying data is inhibited, such that modified data is available without a write back to the main storage location of the data to be modified.

21 Claims, 10 Drawing Sheets

APPARATUS FOR STORING MODIFYING DATA PRIOR TO SELECTIVELY STORING DATA TO BE MODIFIED INTO A REGISTER

This is a continuation of co-pending application Ser. No. 648,851 filed 9/7/84, now abandoned.

BACKGROUND OF THE INVENTION

This invention relates to read and modify sequences of computer systems, and more particularly to modifying portions of data prior to all of such data being available from a main store.

A read, modify, write operation is a common sequence of events in computing systems which have a main storage interface several bytes wide. Prior art systems, such as the IBM System/370 series computers overlapped read and modify operations of data; however such modified data was required to be written back to the same main storage location it was read from. Many operations which do a read/modify/write, modify or replace only a fraction of the bytes which are read. The time the computer system spends waiting for the read to complete before modifying is significant.

U.S. Pat. No. 4,394,736 to Bernstein et al discloses a two level microcode system in which a first level of code has selected fields modified by a second level of code. U.S. Pat. No. 4,040,030 to Cassonnet shows an intermediate buffer for storing instructions. Transfer of the instruction for execution is prevented if a next instruction has the same address. In U.S. Pat. No. 4,084,623 to Gruner, a data processing system provides for an overlapping of the access operations such that access to a second memory module can be obtained by a processor unit before a data transfer has been completed with respect to a first memory module. The above patents do not discuss or provide insight to the problem of modifying data from main store before the data has been fetched.

SUMMARY OF THE INVENTION

A data reading and modifying device of a computer system is coupled to a main storage. The main storage stores first data, portions of which are to be modified by various modifying data. The access speed of the main storage is slower than the speed at which the modifying data is accessed. A control means initiates fetches of first data from the main store and selects the modifying data as a function of selected control words. A register means is coupled to the main storage for receiving and storing first data as it is provided from the main storage. Portions of the modifying data are inserted into the register means as a function of the control words and insertion of the first data into portions of the register means having data inserted or available for insertion is inhibited as a function of the control words, such that modified data is available from the register means without a write back to the main storage location of the data to be modified. Modified data is available from the register means for a write back to a different main store location.

The data reading and modifying device is coupled to the main storage by an interface which is preferably several bytes or one word wide, the same width as the register means. Thus, when a byte in main storage is to be modified, more than one byte is fetched through the interface. For a write back to main storage, all the bytes must be available. In the preferred embodiment, a word is four bytes wide. The control words are stored in a control store which has an access time which is much faster than that of main storage. The modifying data is obtained from an arithmetic logic unit containing various registers specified by the control words. The control words initiate and control reading, modifying and writing of first data. The control word also identifies which bytes are to be modified.

DETAILED DESCRIPTION OF THE PREFERRED EMBODIMENT

Figure 1:
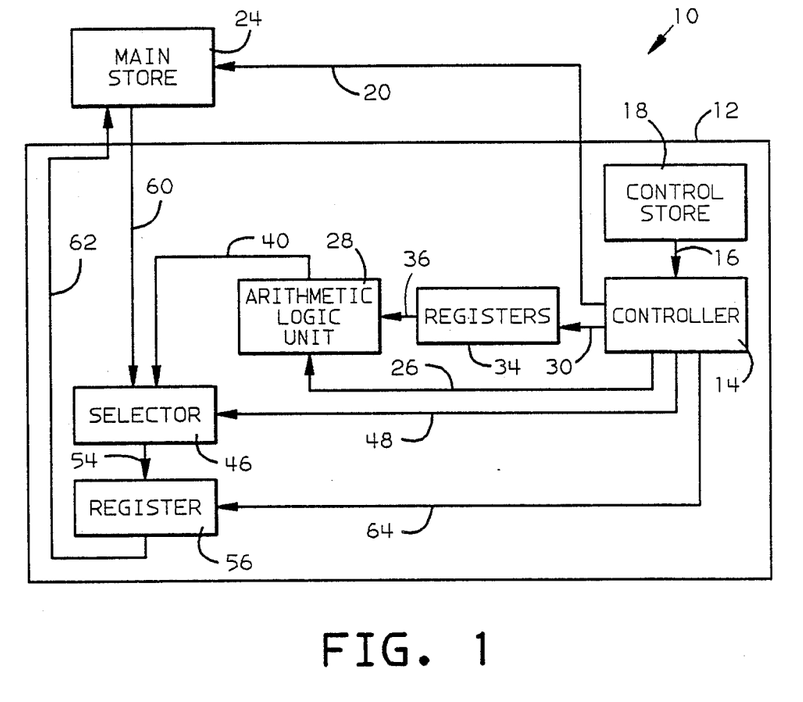
FIG. 1 is a block diagram representation of the operation of the data reading and modifying device of the present invention.

A computer system is indicated generally at 10 in FIG. 1. A data reading and modifying device is represented within a block 12 and comprises a control means, referred to as controller 14. Controller 14 is coupled by a line 16 which is preferably a parallel bit bus to a control store memory 18 which stores control words for execution and decoding by controller 14. The control words indicate the type of operation controller 14 will perform. Controller 14 is coupled by a line 20 to a main store 24. Main store 24 is the main storage device for the computer system 10 which stores data to be modified (first data) and has an access time which is considerably slower than the access of time of control store 18. Thus, several control words are accessed and executed by controller 14 before an access is completed by main store 24. Controller 14 is directed by a first control word to access main store 24. The first control word also indicates the control store address of a second control word which provides information for determining data for a modify operation. Controller 14 is coupled through a line 26 to an arithmetic logic unit 28, and by a line 30 to a set of registers 34 which in turn are coupled to arithmetic logic unit 28 by a line 36. Arithmetic logic unit 28 and registers 34 provide modifying data as a function of the second control word as decoded by controller 14. The modifying data is provided along a line 40 to an inhibiting means, also referred to as selector 46. Selector 46 is coupled by a line 48 to controller 14. Selector 46 is in turn coupled by a line 54 to a register means, also referred to as register 54. The subsequent control words are decoded by controller 14 and provided to selector 46 on line 48 to indicate into which portions of register 56 to insert modifying data. Main store 24 provides the data to be modified to register 56 on a main store interface 60 through selector 46. Selector 46 is set by the subsequent control words such that modifying data is loaded into selected portions of register 56, and the data to be modified from main store 24 is loaded into remaining portions of register 56, but is prevented from being loaded into the selected portions of register 56. The second to last control word indicates the control store address of a last control word which initiates a write from register 56 through a line 62 back to main store 24. The third control signal is provided to register 56 by a line 64 from controller 14. The main store address for the write back to main store is provided to main store 24 on line 20. A significant improvement is that the data need not be written back to main store 24 or can be written back to a different location. This permits early use of the data, saving significant time in read/modify and read/modify/write sequences. The data is thus available to be used in an operation without further access of main store 24 which is a significant savings of time.

In the preferred embodiment, main storage interface 60 is four bytes wide, or one word wide. In the common event of a read and write back to a different or new location, a portion of the four bytes from main store 24 will be written back. The modifying data byte(s) to be written back is placed in one of the registers 34, and while the word in the different storage location which is located about the address the byte to be written back into is read, the byte in registers 34 is loaded into register 56 in the correct location as specified by the subsequent control words. That location can be any one of the addresses of the four bytes in the new location. The word is then loaded into register 56 without the modified byte being disturbed and then the word is written into the correct main store 24 location as specified by the last control word. Without the present invention, the word in main store 24 which is to have the bytes written into would have had to have been completely written into register 56, and then the subsequent control words would be executed such that the bytes to be written back to main store 24 would be written into register 56. With the present invention, the subsequent control words are usually fully executed before the first data is received from main store. This significantly improves performance of the computer system by executing control words earlier because the modifying data is inserted before the main store fetch is completed.

It is to be noted that the main storage interface 60 need not be one word wide. The present invention is useful with interfaces narrower or wider than that specified in this invention. The bytes modified by the invention are preferably 8 bits wide; however, it is within the scope of the present invention for a single or selected bits of the word to be modified.

Figure 7:
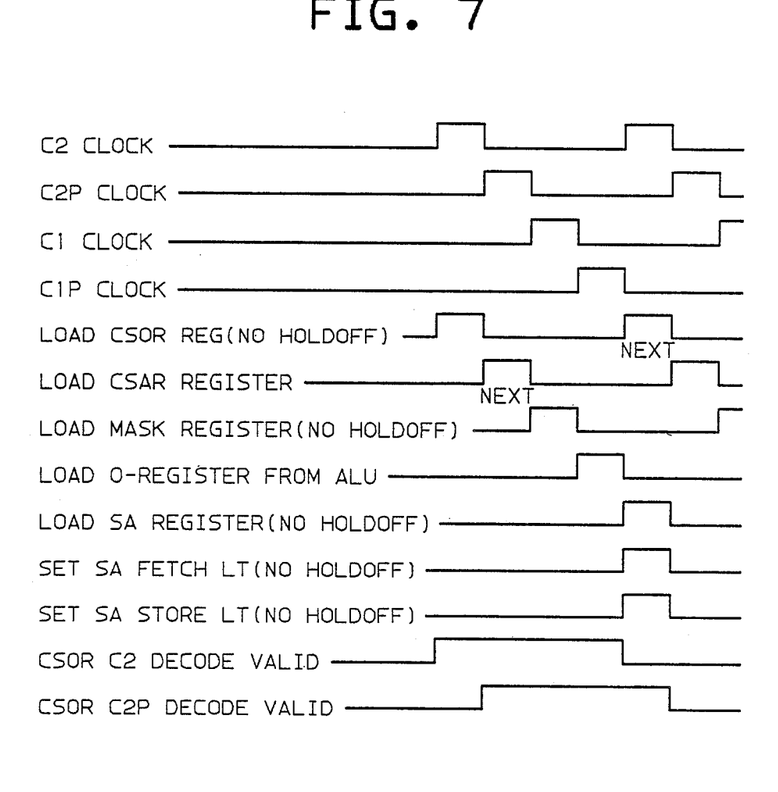
FIG. 7 is a timing diagram of the data reading and modifying device of FIGS. 2 through 6 showing internal signals and their relationship to selected clocks.
Figure 8:
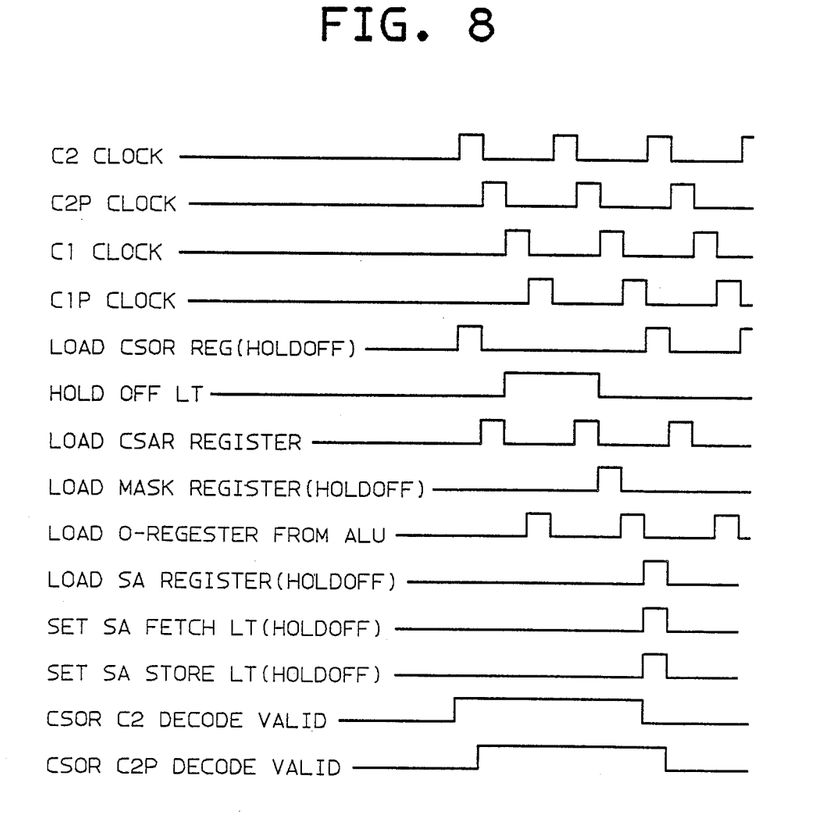
FIG. 8 is a further timing diagram of the data reading and modifying device of FIGS. 2 through 6 representing a different mode of operation.

The preferred embodiment of the present invention comprises a hardware implementation, details of which will now be given with reference to the block diagrams in FIGS. 2 through 6 and the timing diagrams in FIGS. 7 and 8.

Signals indicated in FIGS. 2 through 6 are named and often continue on separate pages of drawing. For convenience and readability, those connections are not physically shown but do exist in the functioning systems built.

Figure 2A:
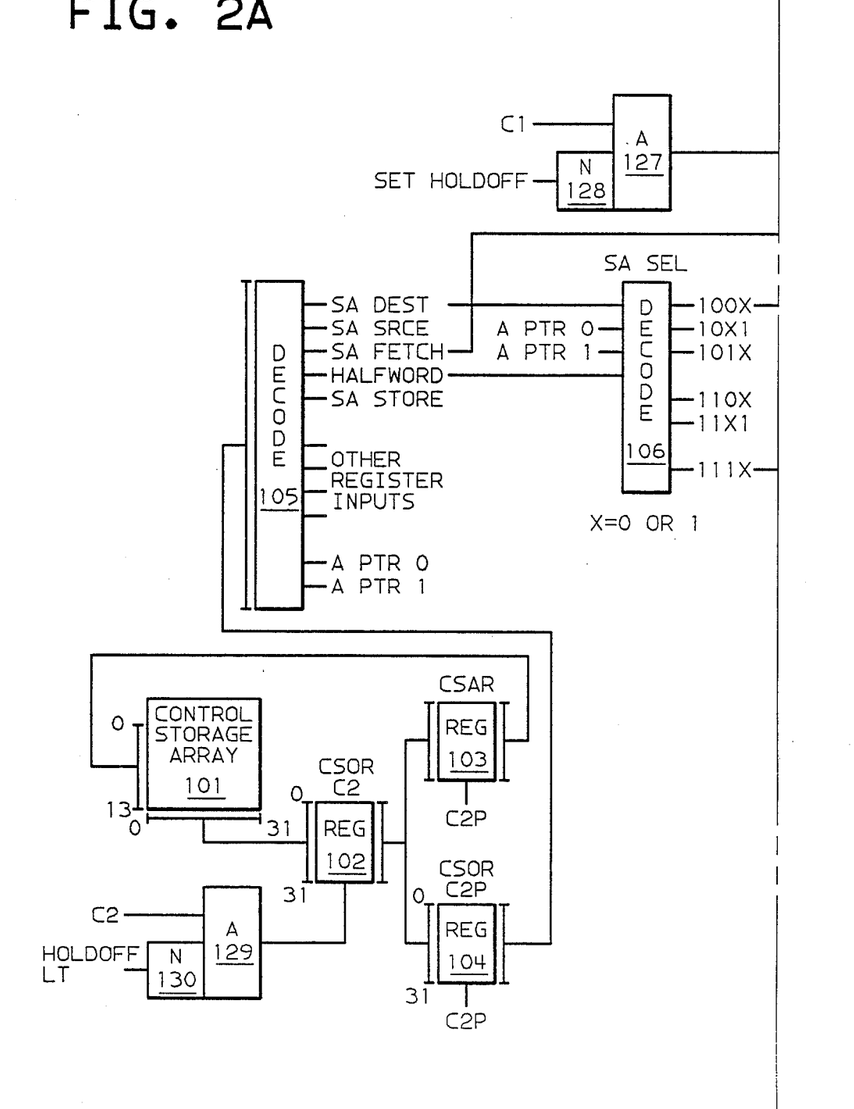
FIGS. 2A–2B, 3–4, 5A–5B and 6 are a detailed schematic representation of the data reading and modifying device of the present invention showing detailed interaction of components.
Figure 2B:
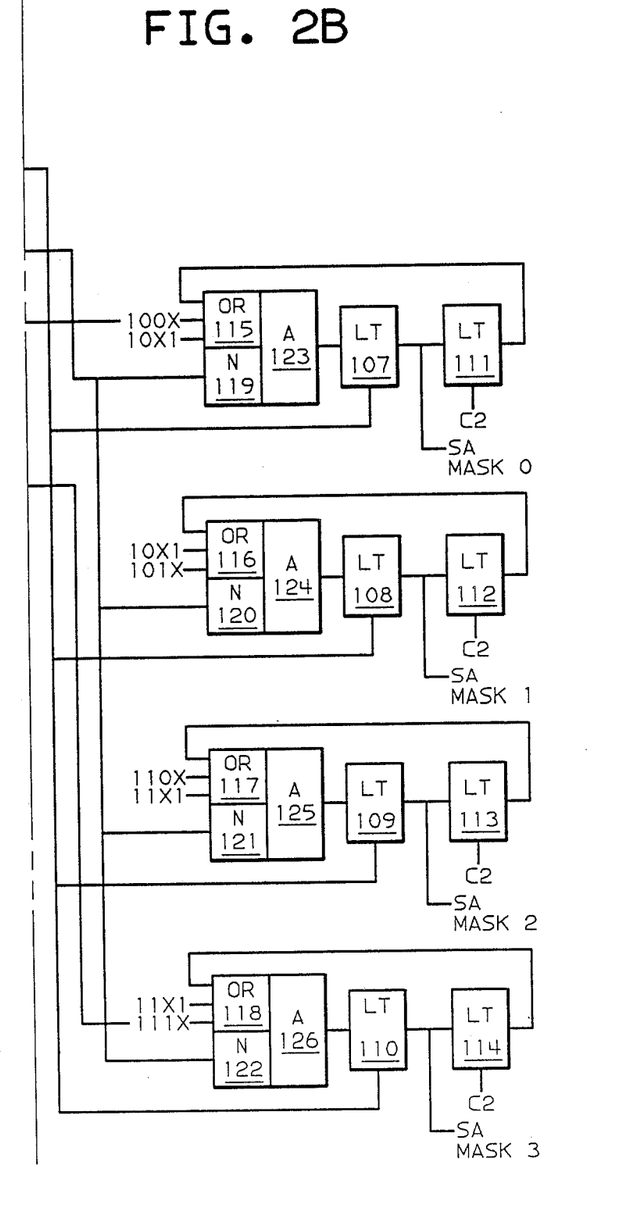

The hardware executes control word instructions stored in a control storage array 101 in FIG. 2. Each control word is executed during a fixed number of clocks C2, C2P, C1 and C1P which are indicated in FIG. 7 as consecutive fixed length pulses during which execution of the control words progresses until a further clock signal is needed. A control storage output register 102 is loaded at a C2 clock time with a first control word instruction from control storage 101. Portions of the first control word are copied into a control storage address register 103 and the entire first control word is copied into a second control storage output register 104 at the second clock signal C2P. While the first control word instruction is being executed, the next control word instruction is being fetched from control storage array 101 using the address in address register 103.

Figure 5A:
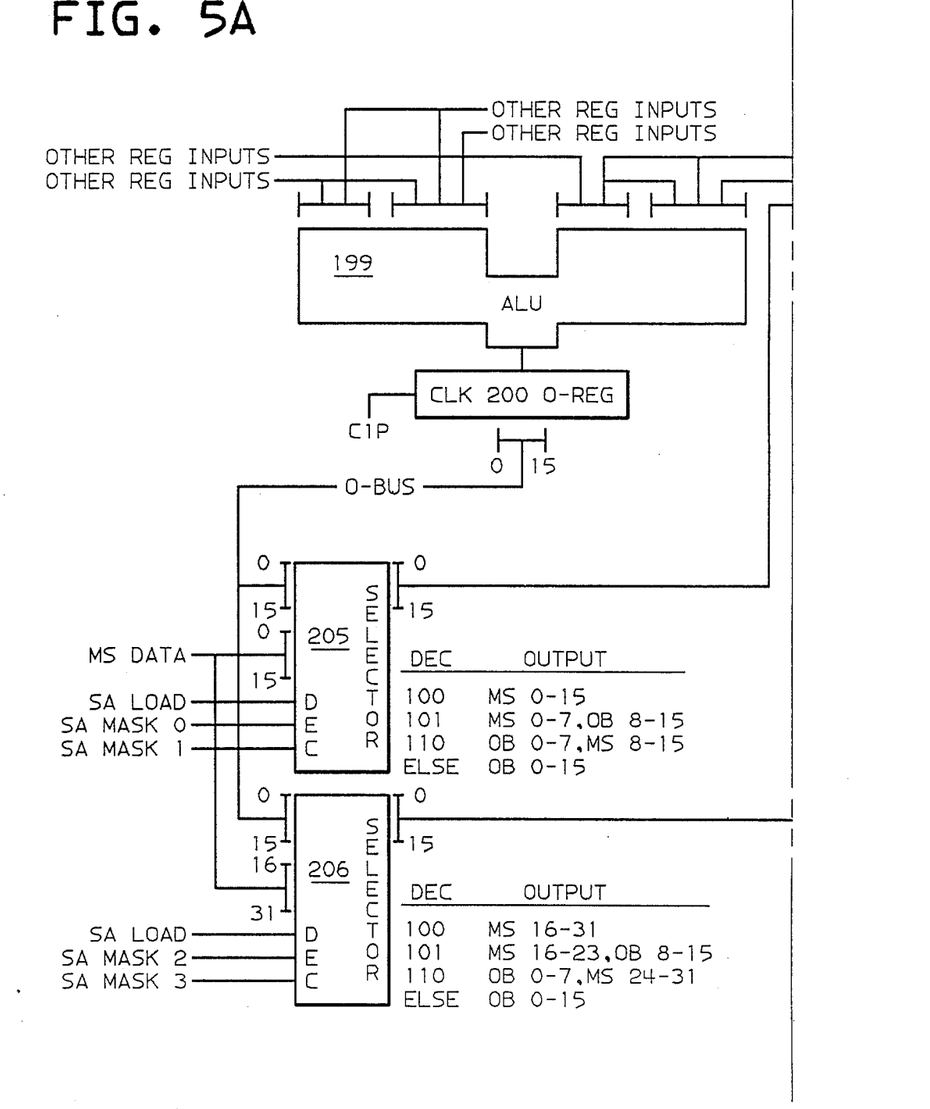
Figure 5B:
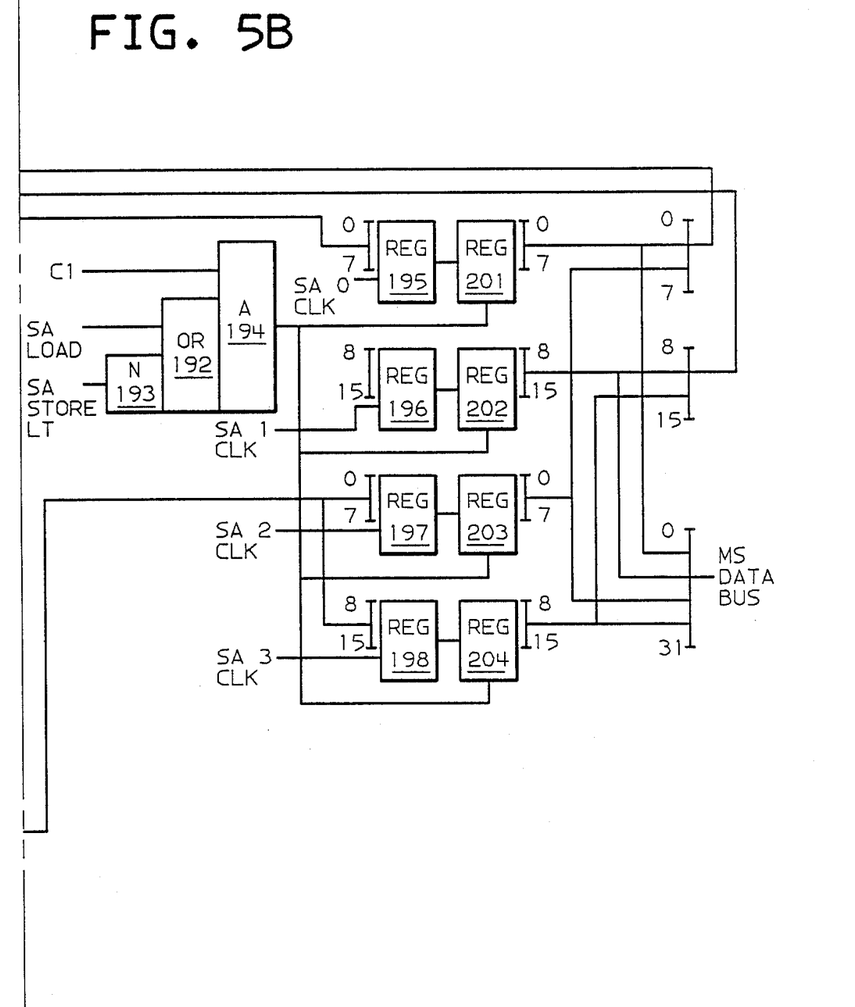
Figure 6:
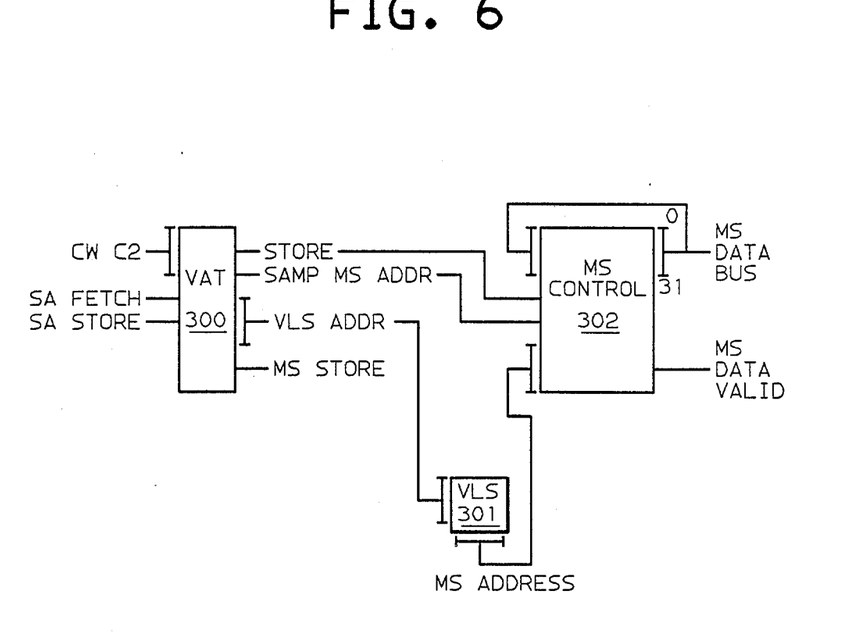

During the C2P clock, the first control word is executed by a decoder 105 which decodes control words into control signals. Portions of the control signals are designated 'other registers inputs' which are gated to an arithmetic logic unit (ALU) 199 in FIG. 5 and loaded into an output register 200 at a C1P clock. The other registers have outputs feeding ALU 100 and contain the modifying data. Decoder 105 provides a storage access (SA) FETCH control signal and a SA STORE control signal to a virtual address translator (VAT) 300 in FIG. 6 to initiate a main storage fetch of first data to be modified or a store of data respectively. Control storage output register 102 also provides an address to VAT 300 indicated as CW C2 in FIG. 6. A VAT local storage (VLS) 301 determines a main storage address (MS ADDRESS) from a VAT local storage address (VLS ADDR) and gates the main storage address into a main storage control (MS CONTROL) 302 which initiates a main storage fetch of data to be modified. VAT 300 maintains a main storage store (MS STORE) signal valid until the main storage fetch completes. When the main storage data to be modified has been read from the main storage, the main storage control 302 activates a MS DATA INVALID signal indicating that valid first data to be modified (MS DATA) is available.

As the next clock time C1, a number of SA MASK latches 107, 108, 109 and 110 are set as a function of signals from decoder 105 and a decoder 106. Decoder 105 provides a SA DEST (storage access register destination) signal, a HALFWORD signal, an A PTR 0 (pointer) signal and an A PTR 1 signal to decoder 106. The A PTR signals indicate which byte of the data to be modified is to be altered by the control word instruction and the HALFWORD signal indicates whether one or two bytes of the data is to be altered. If the A PTRs have the indicated values, 0 and 1 respectively, and the HALFWORD signal is equal to 1, and SA DEST then, of the signals provided by decoder 106, 10x, and 101x are active causing latch 107 and latch 108 to provide active signals SA MASK 0 and SA MASK 1 RESPECTIVELY. An SA FETCH signal from decoder 5 indicating a fetch from main store is to be initiated resetting the SA MASK 0, 1, 2, and 3 registers 107, 108, 109 and 110 by a plurality of NOT gates 119, 120, 121, and 122. The result of NOT gate 119 is ANDed by an AND gate 123 with an OR of the 100x and 10x1 signals by an OR gate 115 to provide the active signal SA MASK 0. Similarly, an OR gate 116 ORs the 10x1 and 101x signals. The result is ANDed by an AND gate 124 with the result from NOT gate 120 which inverts the SA FETCH. Two other OR gates 117 and 118 are coupled to NOT gates 121 and 122 and AND gates 125 and 126 respectively and to latches 109 and 110 to provide SA MASK 2 and SA MASK 3 signals as a function of control signals from decoders 105 and 106. Four more latches 111, 112, 113 and 114 are latched to the SA MASK 0-4 signals respectively on a C2 clock and in turn are repectively coupled to OR gates 115-118 since the clock does not stop, and latches 111, 112, 113, 114 are respectively coupled to OR gates 115-118 to "remember" the value of the latch.

The SA MASK signals 0-4 are carried to a pair of selectors 205 and 206 in FIG. 5 which in turn are coupled to four paris of SA register latches 195 and 201, 196 and 202, 197 and 203, and, 198 and 204 which are loaded with selected data through selectors 205 and 206. The four sets of SA register latches correspond to the four bytes of data to be modified (MS DATA) which are fetched from main storage. Selectors 205 and 206 are provided with MS DATA, and modifying data from output register 200 on an output bus (0-BUS). Selector 205 contains logic responsive to SA LOAD, SA MASK 0 and SA MASK 1 such that desired combinations of MS DATA and modifying data from output register 200 output bus (0-BUS) are provided to SA registers 195, 201 and 196, 203 as indicated in a table located adjacent selector 205. SA LOAD corresponds to D, SA MASK 0 corresponds, to E, and SA MASK 1 corresponds to C in the table. When D=, and C=0, bits 0-7 are modifying data (OB in the table) and are loaded into SA registers 195 and 201. Bits 8-15 comprise of MS DATA and are loaded into SA registers 196 and 202. Selector 206 contains logic responsive to SA LOAD, SA MASK 2 and SA MASK 3 such that desired combinations of MS DATA and modifying data from output register 200 output bus (0-BUS) data are provided to registers 197, 203 and 198, 204 as indicated in a table located adjacent selector 206. Multiple combinations of SA registers are capable of being loaded with modifying data before the main storage access is complete. Once the SA registers are loaded with desired modifying data, and the MS DATA is available, selectors 205 and 206 selectively inhibit or block the MS DATA from loading into SA registers containing modifying data. If for any reason the modifying data was available at the same time, selectors 205 and 206 still prevent MS DATA from being loaded into registers intended for modifying data as indicated by the control signals comprising SA LOAD, SA MASK 0, SA MASK 1, SA MASK 2 and SA MASK 3.

Figure 3:
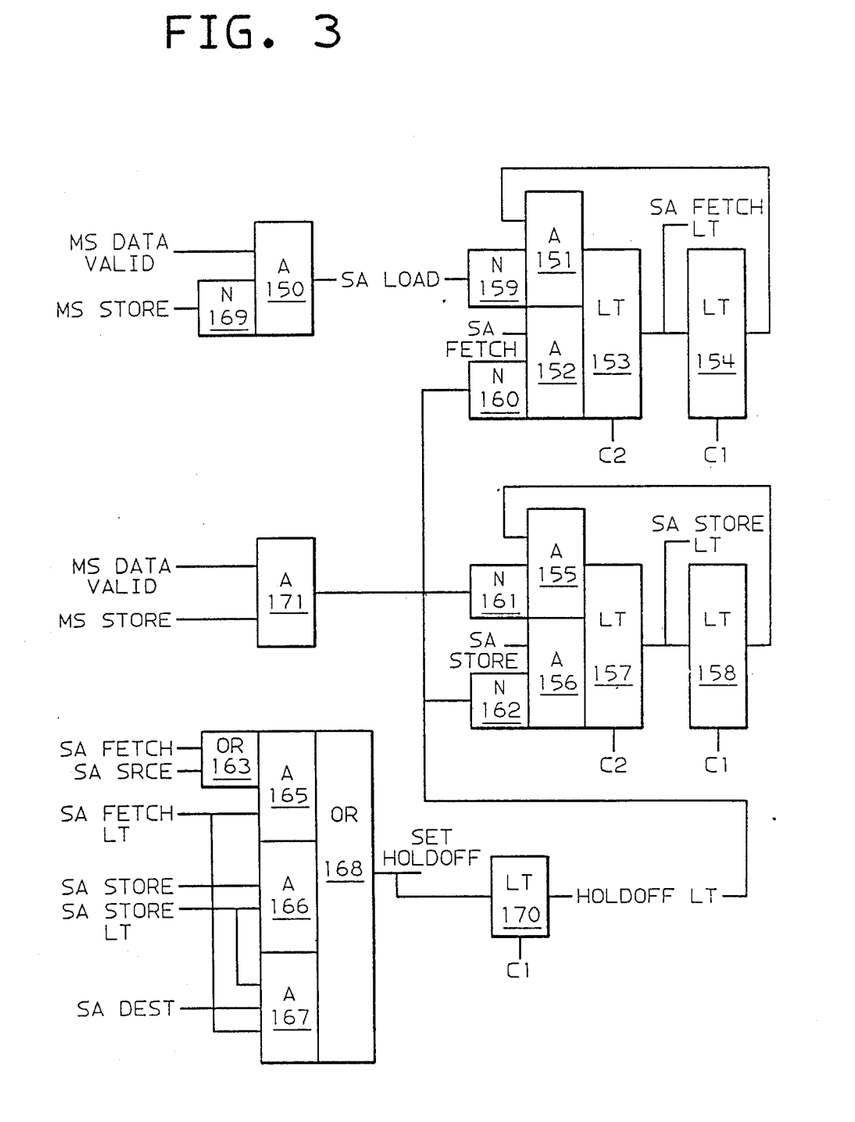

Further detail of the timing of the present invention is discussed with reference to FIG. 3. The MS DATA VALID and MS STORE signals are ANDed by an AND gate 171 and the result is inverted by a NOT gate 161, then through an AND gate 155 and to a latch 157 for in part providing a SA STORE LT signal on a C2 clock which indicates that a main storage store is taking place. The MS STORE signal is inverted by a NOT gate 169 and is ANDed with the MS DATA VALID signal by an AND gate 150 to provide an SA LOAD signal. The SA LOAD signal is inverted by a NOT gate 159, then through an AND gate 151 to a latch 153 which in part provides an SA FETCH LT signal on a C2 clock which indicates that a main storage fetch is in progress. The SA FETCH signal and a SA SRCE (indicating that the SA registers are the source of data for a particular operation) signal from decoder 105 are ORed by an OR gate 163 and the result is ANDed by an AND gate 165 with the SA FETCH LT signal. That result is provided to an OR gate 168. Similarly, SA STORE and SA STORE LT are ANDed by an AND gate 166 and SA FETCH LT, SA STORE LT, and SA DEST are ANDed by an AND gate 167 and provided to OR gate 168 which provides a SET HOLDOFF signal to indicate that an operation which requires the SA registers is already in progress. The SET HOLDOFF signal is provided to a latch 170 which provides a HOLDOFF LT signal at a clock time C1. The HOLDOFF LT signal is inverted by a NOT gate 160 and ANDed by an AND gate 152 with the SA FETCH signal with the result being ORed with the result from AND gate 151 to provide the SA FETCH LT signal from latch 153 on a C2 clock. A further latch 154 is coupled to latch 153 and provides the SA FETCH LT signal to AND gate 11 on a C1 clock to keep the SA FETCH LT 153 set. The HOLDOFF LT signal is also inverted by a NOT gate 162, the result being ANDed by AND gate 156 with the SA STORE signal with the result being ORed with the result from AND gate 155 to provide the SA STORE LT from latch 157 on a C2 clock. A further latch 158 is coupled to latch 157 and provides the SA STORE LT signal to AND gate 155 on a C1 clock to keep the SA STORE LT 157 set.

Figure 4:
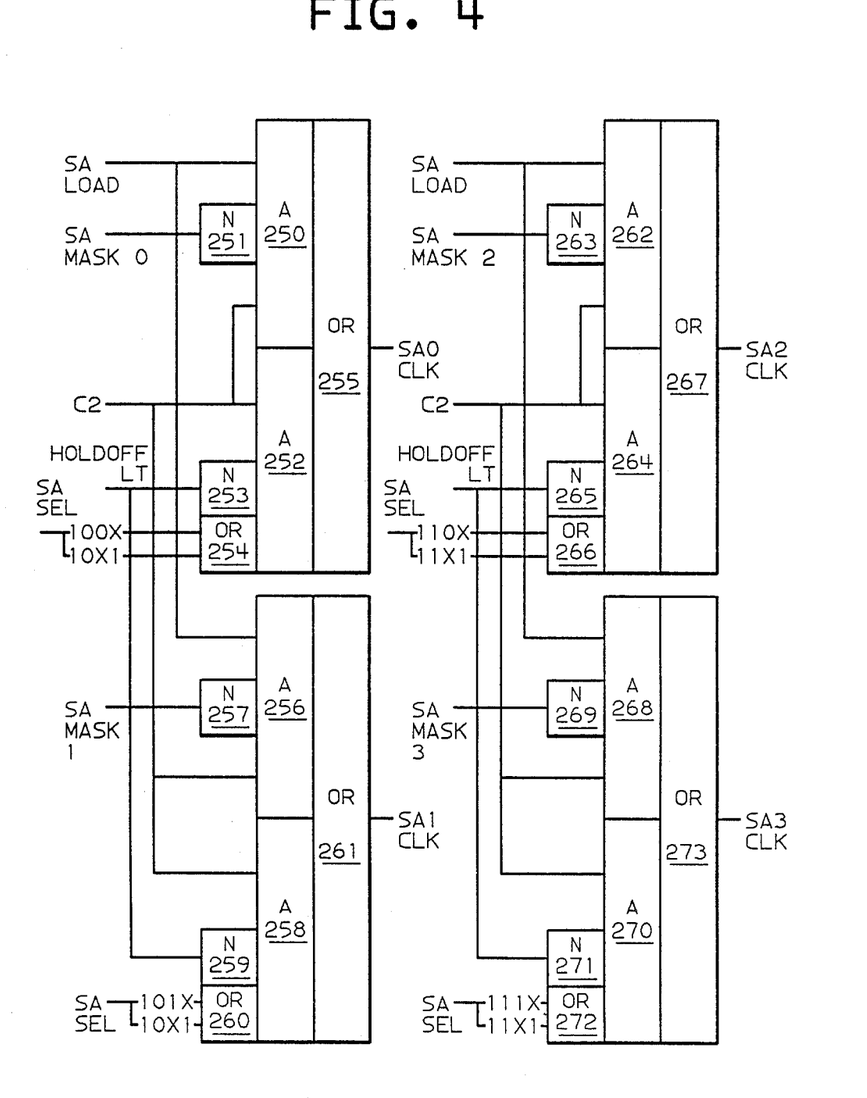

Further timing details are discussed with reference to FIG. 4. The SA LOAD signal is provided to an AND gate 250 and an AND gate 256. The SA MASK 0 signal is inverted by a NOT gate 251 and ANDed with the SA LOAD signal by AND gate 250 on a C2 clock. The HOLDOFF LT signal is inverted by a NOT gate 253 and SA SEL signals 100x and 10x1 from decoder 106 are ORed by an OR gate 254 and ANDed with the result from NOT gate 253 in an AND gate 252 on a C2 clock. The results from AND gates 250 and 252 are ORed by an OR gate 255 to provide an SA 0 CLK signal which clocks SA register 195 in FIG. 5. When valid MS DATA is available in a fetch operation, a C2 clock time, SA 0 CLK will be active and enable loading of SA register 195 since SA MASK 0 was not previously set. SA 0 CLK is also active on a C2 clock provided that the HOLDOFF LT signal is not active and at least one of the SA SEL signals 100x and 10x1 are active. This is for the case where the output of the ALU 199 is to be inserted into the SA register 195.

Similarly, the SA MASK 1, 2 and 3 signals are received by NOT gates 257, 263 and 269 respectively. SA SEL signals 101x and 10x1, 110x and 11x1, and 111x and 11x1 are respectively provided to OR gates 260, 266 and 272. The SA LOAD signal is provided to AND gates 256, 262 and 268. The HOLDOFF LT signal is supplied to NOT gates 259, 265 and 271, and the C2 clock is provided to pairs of AND gates 256 and 258, 262 and 264, and 268 and 270, with the results from such pairs of AND gates being ORed by OR gates 261, 267 and 273 respectively to provide an SA 1 CLK signal, an SA 2 CLK signal and an SA 3 CLK signal which clock SA registers 196, 197 and 198 respectively. At the C2 clock time, the modifying data and the MS DATA if available is loaded into the SA register specified by the control word instruction as decoded by decoder 105, and the next control word instruction is loaded into the register 102.

The HOLDOFF LT signal is inverted by a NOT gate 130 in FIG. 2 and then ANDed with clock C2 by an AND gate 129 to clock register 102 such that when a control word instruction attempts to use the SA register that is involved in another activity, and cannot therefore be executed, a further control word is not loaded into register 102. The SET HOLDOFF signal is inverted by a NOT gate 128 and then ANDed with clock C1 by an AND gate 127. This result is coupled to latches 107, 108, 109 and 110 such that they are only loaded on C1 clocks when the SET HOLDOFF signal is inactive. FIG. 8 shows operation when the HOLDOFF LT signal is active. The HOLDOFF LT signal also blocks any further alteration of SA FETCH LT 153 if SA FETCH 153 is already set and SA FETCH or SA SRCE is active. The HOLDOFF LT signal also blocks any further alteration of SA STORE LT 157 if SA STORE LT 157 is already set and SA STORE of SA DEST is active. The HOLDOFF LT signal also blocks SA 0, 1, 2, 3 clocks as well as alteration of SA MASK 0, 1, 2, 3. FIG. 7 illustrates operation when the HOLDOFF LT signal is not active.

One further timing mechanism is utilized on a write to main store in FIG. 5. The SA STORE LT signal is inverted by a NOT gate 193 and ORed with the SA LOAD signal by an OR gate 192. The result is ANDed with clock C1 by an AND gate 194 which in turn is coupled to SA registers 201, 202, 203, and 204 such that SA registers 201, 202, 203, and 204 are loaded with data on C1 clocks to load the data fetched from main store.

DESCRIPTION OF A FETCH/MODIFY/STORE OPERATION

To initiate a main storage fetch to the SA registers 195, 196, 197 and 198, a control word instruction is loaded into the register 102 at a C2 clock time, provided the HOLDOFF LT signal is not set. At a C2P clock time, the register 104 and the register 103 are respectively loaded with the control word instruction and the next control word address. The control word instruction is executed by means of decoder 105 and decoder 106. When a fetch to the SA registers 195-198 is executed, the SA MASK latches 107, 108, 109 and 110 are initialized to 0 or reset by means of AND gates 123, 124, 125 and 126 and NOT gates 19, 120, 121, and 122 at a C1 clock time by means of AND gate 127 and NOT gate 128. For purposes of this discussion, the control word instruction does not contain a SA register destination (SA DEST), nor is the SA register used as a source (SA SRCE) to the arithmetic logic unit 199.

The SA FETCH signal from decoder 105 along with the register 102 are used by the VAT 300 to initiate a main storage fetch to the SA register 195-198. The VAT 300 selects the main storage address from the VLS 301 and gates the main storage address into the MS CONTROL 302 by means of a SAMP MS ADDR signal. Since the STORE signal, which indicates a storage operation, from VAT 300 is inactive, the MS CONTROL 302 initiates a main storage fetch. The VAT 300 also causes the MS STORE signal to become inactive since a fetch was started, and no other main storage operations are being processed. The VAT 300 maintains the MS STORE signal until the main storage fetch completes and if a store has been queued, causes the MS STORE signal to become active. When the main storage data (MS DATA) has been read from the main storage, the MS CONTROL 302 will activate the MS DATA VALID signal indicating the data is valid on the MS DATA bus.

At the end of the control word execution (C2 clock time), the SA FETCH latch 153 will be set by means of AND gate 152 and NOT gate 160. When the SA FETCH latch 153 is set, the SA register 195-198 is being used by the main storage control and the SA register cannot be used as a source to the arithmetic logic unit 199 in a control word instruction. The SA FETCH latch 153 remains set until the MS CONTROL 302 activates the MS DATA VALID signal.

The next control word is then loaded into the register 102 at the same C2 clock time that the SA FETCH latch 153 is set. Since only part of the main storage data that is fetched is to be stored, the next control word instruction may contain a SA register destination (SA DEST) usin A PTR 0, A PTR 1, and HALFWORD signals as decoded by decoder 105 which indicates that a portion of the SA register is to be modified. The control word instruction is moved from the register 102 into the register 104 at a C2P clock time. The next control word instruction address is also loaded into the register 103 at the C2P clock time. The SA DEST signal from decoder 105 will become active until a new control word instruction is loaded into the register 104.

At the next clock time, C1, the SA MASK latches 107–110 will be set depending on the value of the A PTRs and the HALFWORD signals from decoders 105 and 106. The A PTR signals indicate which byte of the SA register 195-198 is to be altered by the control word instruction and the HALFWORD signal indicates whether one or two bytes of the SA register 195-198 are to be altered. The decoder 106 selects which of the four SA registers 195-198 are to be loaded with data from the output register 200. If a PTR 0 is equal to 0, A PTR 1 is equal to 1, and HALFWORD is equal to 1, then the decoder 106 signals 10X1 and 101x will be active causing the SA MASK 0 and SA MASK 1 latches 107 and 108 to be set by means of OR gates 115 and 116, AND gate 127 and NOT gate 128. If the control word specified the SA register 195-198 both as a source to the ALU 199 as well as a destination from the output register 200, then the SET HOLDOFF signal becomes active by means of the SA SRCE signal from decoder 105, OR gate 163 and 168 and AND gate 165 causing AND gate 127 to block the C1 clock such that the latches 107–110 will not be altered. In addition, the HOLDOFF LT 170 will be set blocking the SA CLK 0, 1, 2 and 3 signals from loading the SA register 195-198 and block loading of a new control word into the output register 102 until the SA fetch has completed.

At the C1P clock time, the output of the output register 200 is loaded with the data from the source register passed through the ALU 199.

At a C2 clock time, the output of the output register 200 is passed through selectors 205 and 206, and is clocked into SA registers 195 and 196 by means of OR gates 254, 255, 260, and 261, AND gates 252 and 256 and NOT gates 253 and 259. At this C2 clock time the next control word instruction is loaded into the register 102.

At the completion of the second control word instruction execution, SA MASK 0 and 1 latches 107 and 108 are set indicating the first and second byte of the SA register 195 and 196 have been altered and that the fetched data from main storage should not alter these bytes of the SA register. If the data from main storage became valid as indicated by the MS DATA VALID signal at the same time that the output register 200 was being written into the SA register 195 and 196, then selector 205 still passes the modifying data from output register 200 to SA registers 195 and 196 since SA MASK 0 and 1 would now be set. Selector 206 on the other hand, passes the MS DATA bus bits 16–31 since the SA LOAD signal from AND gate 150 and NOT gate 169 are active and the SA MASK 2 and SA MASK 3 signals from latches 109 and 110 are not set. SA registers 197 and 198 will be loaded with the MS DATA from MS CONTROL 302 by means of AND gates 262 and 268, OR gates 267 and 273, and NOT gates 263 and 269.

The next control word instruction is moved into the register 104 at the next C2P clock. The next control word address is also loaded into the register 103 at this C2P clock. If the next control word instruction is a main storage store operation, the SA STORE signal from decoder 105 will become active. The VAT 300 reads the main storage address from the VLS 301 and activates both the SAMP MS ADDR signal to the MS CONTROL 302 and with the STORE signal indicating the MS CONTROL is to perform a main storage store operation. The MS STORE signal from the VAT 300 does not become active yet since the main storage fetch operation to SA registers is not yet complete. The MS CONTROL Logic 302 will queue the store request and will execute the store when the fetch has finished.

At the next C2 clock time, the SA STORE LT 157 is set by means of AND gate 156 and NOT gate 162. The next control word instruction is also loaded into the register 102 at this time. If the next control word instruction contains a SA source to the ALU 199, the SA SRCE signal from decoder 105 will become active causing the HOLDOFF LT 170 to be set by means of AND gate 165 and OR gates 163 and 168. The HOLDOFF LT 170 will block the output register 200 from being loaded into the destination register. Until the MS VALID signal from MS CONTROL 302 becomes valid resetting the SA FETCH latch 153, the control word instruction will be re-executed but the destination registers and latches 107-110 will not be altered. If any of the next control word instructions contain a SA register destination, the SA DEST signal from decoder 105 will become active causing the SET HOLDOFF signal to become active and the HOLDOFF LT 170 to be set by means of AND gate 167 and OR gate 168. The SET HOLDOFF signal prevents the SA MASK latches 107-110 from being altered until the main storage fetch completes. The HOLDOFF LT 170 prevents the SA registers 195-198 from being clocked by means of NOT gates 253, 259, 265 and 271.

When the main storage fetch completes, the MS CONTROL 302 will activate the MS DATA VALID signal causing the SA FETCH LT 153 to be reset by means of AND gates 150 and 151 and NOT gates 159 and 169. At the same time the SA FETCH LT 153 is reset, the SA registers 197 and 198 will be loaded with the MS DATA bits 16-31 from selector 206 and AND gates 150, 262 and 268, NOT gates 169, 263 and 269 and OR gates 267 and 273. The first two bytes of SA register 195 and 196 will not be altered because SA MASK 0 and SA MASK 1 latches 107 and 108 are set.

At the C1 clock time after the fetch completes, the data from the SA registers 195-198 is loaded into the SA L2 registers 201-204 by means of NOT gate 169, AND gates 150 and 194 and OR gate 192. The SA L2 register 203-204 now contains the fetched data from main storage and SA L2 register 201 and 202 contains the SA destination data from the output register 200. Since the MS CONTROL 302 has queued a main storage store command, the SA L2 register 201-204 data will be gated to the MS CONTROL 302. The VAT 300 activates the MS STORE signal to indicate a main storage store operation is in progress.

When the MS CONTROL 302 is finished with the store operation, the MS DATA VALID signal is activated causing the SA STORE LT 157 to be reset by means of AND gates 171 and 155 and NOT gate 161. This completes the main storage store cycle.

What is claimed is:

1. In a data reading, modifying, and writing device of a computer system having a main storage for storing data to be modified by control data stored in a control store which indicates modifying data, stored in a second storage means wherein the access speed of the main storage is slower than the speed at which the control data and modifying data is accessed, the improvement comprising:

fetch means coupled to the main storage for initiating a fetch from main storage of the data to be modified;

register means coupled to the main storage for receiving and storing data to be modified as it is provided from the main storage;

insertion means for receiving modifying data from the second storage means before the data to be modified is received by the register means and storing at least one portion of the modifying data into the register means; and inhibiting means coupled to the register means and to the control store for inhibiting storing of the data to be modified in the portions of the register means having modifying data already stored by the insertion means, as indicated by the control data, such that modified data is available for use in the computer system before a write back to the main storage location of the data to be modified.

2. The device of claim 1 wherein the modifying data is stored into selected portions of the register means before the data to be modified is stored into the register means.

3. The device of claim 1 wherein data to be modified comprises a predetermined number of bytes of data stored together in main storage, and the insertion means stores at least one byte of modifying data into the register means.

4. The device of claim 1 further comprising control means coupled to the main storage, the register means, the insertion means and the inhibiting means for executing the control data to control and synchronize the inhibition means to inhibit storage of the data to be modified in portions of the register means when the data to be modified is received by the register means from the main storage.

5. The device of claim 4 and further comprising control store means coupled to the control means providing control data to the control means.

6. The device of claim 5 and further comprising logic means coupled to the control means and the insertion means for providing the modifying data to the insertion means as a function of the control data.

7. The device of claim 5 and further comprising blocking means coupled to the control means for blocking execution of further control data by the control means as a function of reception of data to be modified by the register means.

8. In a data reading and modifying device of a computer system having a main storage for storing first data, portions of which are to be modified by various modifying data stored in a second storage as indicated by control data stored in a third storage wherein the access speed of the main storage is slower then the speed at which the modifying data is accessed, the improvement comprising:

a controller for initiating fetches of first data from the main storage, selecting the modifying data from the second storage, and providing a control signal as indicated by the control data obtained from the third storage;

register means coupled to the main storage for receiving and storing first data as it is provided from the main storage;

insertion means for receiving modifying data from the second storage and inserting at least portions of the modifying data into the register means as indicated by the control signal; and inhibiting means coupled to the register means and to the controller for inhibiting storing, in response to the control signal, of the first data in portions of the register means having modifying data stored therein, such that modified data is available, without a write back to main storage.

9. The device of claim 8 wherein the modified data is written back to main store in a location different than the location of the data to be modified.

10. The device of claim 8 wherein the modified data is available from the register means for use in an operation by the computer system.

11. Apparatus for modifying data in a computer system, comprising:
first storage means for storing data to be modified;
second storage means for storing modifying data, said second storage means having a shorter access time than the first storage means;
control means for initiating fetches of modifying data from the second storage means and data to be modified from the first storage means, said fetches are initiated close in time;
register means for receiving data to be modified and modifying data from the first and second storage means, said modifying data being received from the second storage means in portions of the register means before the data to be modified is received as a result of the shorter access time of the second storage means; and
selector means coupled between the first storage means and the register means for inhibiting data to be modified from being stored in portions of the register means already containing modifying data such that after the data to be modified are selectively received by the register means, the modified data is available without a write back to the first storage means.

12. The apparatus of claim 11 wherein the control means provides placement information to the selector means to identify the portions of the register means to be modified by the modifying data.

13. The apparatus of claim 11 and further comprising a control storage coupled to the control means for storing control words which are executed by the control means.

14. The apparatus of claim 13 wherein the control words describe the modifying data and data to be modified and the locations in the register means where each of said data is to be stored.

15. The apparatus of claim 14 and further comprising an arithmetic logic unit having a plurality of registers comprising said second storage means, said logic unit being controlled by the control means.

16. The apparatus of claim 15 wherein the control words identify the logic unit registers containing modifying data, said registers providing the modifying data much faster than the first storage means providing data to be modified.

17. A method of performing a read/modify/write operation in a computer system having a register coupled between a main storage and an arithmetic logic unit (ALU), the method comprising the steps of:
initiating a fetch from main storage of data, portions of which are to be modified;
setting a selector between the main storage and the register prior to completion of the fetch from main storage of data to be modified so that the selector indicates the locations in the register which should contain modifying data and which should contain data to be modified;
fetching modifying data from a second storage after the fetch to main storage has been initiated, and prior to the completion of the main storage fetch;
storing the modifying data in register locations indicated by the selector;
inhibiting storing of portions of the data to be modified corresponding to the register locations indicated by the selector for modifying data already stored therein; and
storing the other portion of data to be modified which was not inhibited from being stored, in the register locations indicated by the selector.

18. The method of claim 17 and further comprising the step of:
sending the modified data to the ALU without writing the modified data back to said main storage.

19. A data read/modify/write mechanism for performing read/modify/write operations in a computer system comprising:
a control store containing a plurality of control words for controlling the read/modify/write operations;
a controller coupled to the control store for decoding the control words and routing the decoded control words;
at least one register containing modifying data;
an ALU coupled to the controller for receiving decoded control words, and coupled to the at least one register for receiving modifying data as controlled by the decoded control words;
a main storage containing data to be modified;
a main storage controller coupled between the controller and the main storage for receiving decoded control words from the controller and retrieving data to be modified as controlled by the decoded control words;
register means coupled between the ALU and the main storage, and coupled to the controller for storing data to be modified from the main storage, and modifying data from the ALU; and
selector means coupled between the register means and the main storage and ALU, and coupled to the controller for receiving control words which set the selector means to select the modifying data and data to be modified for storage in the register means as controlled by the control means, wherein the register means is in turn coupled to the ALU to supply the ALU with modifying data prior to the modified data in the register means being written back to main storage.

20. The mechanism of claim 19 wherein the data to be modified is a multibyte word of data, and wherein the selector means comprises:
a plurality of first input lines coupled to the main storage for receiving each byte of the word of data;
a plurality of second input lines coupled to the ALU for receiving each byte of the modifying data; and
a plurality of control lines coupled to the controller for receiving a signal on each line corresponding to each byte location of the register means.

21. The mechanism of claim 20 wherein the selector means further comprises:
a decoder coupled to the plurality of first input, second input, and control lines for selectively coupling the plurality of first input lines and second input lines to the register means as decoded from the signals on the control lines so that modifying bytes are stored in the register means at desired locations, and bytes of the data to be modified which are not to be modified are stored in the register means at desired locations.

* * * * *